United States Patent Office 3,646,034
Patented Feb. 29, 1972

3,646,034
2,3-DIHYDRO-2-(5-NITRO-2-THIENYL)
QUINAZOLIN-4(1H)ONES
Robert J. Alaimo, Norwich, N.Y., assignor to The
Norwich Pharmacal Company
No Drawing. Filed May 18, 1970, Ser. No. 38,553
Int. Cl. C07d 51/48
U.S. Cl. 260—251 QA                   4 Claims

ABSTRACT OF THE DISCLOSURE

A series of 2,3-dihydro-2-(5-nitro-2-thienyl)quinazolin-4(1H)ones of the formula:

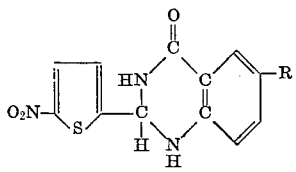

wherein R is hydrogen, chloro or nitro are especially inimical to *Hemophilus vaginalis*.

The invention relates to chemical compounds. More particularly it is concerned with 2,3-dihydro-2-(5-nitro-2-thienyl)quinazolin-4(1H)ones of the formula

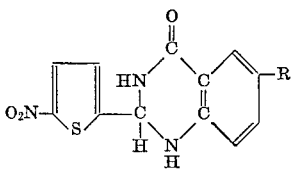

wherein R is hydrogen, chloro or nitro.

The members of this series of compounds are distinguished in their ability to inhibit *Hemophilus vaginalis*, the organism frequently implicated in bacterial vaginitis. Under the commonly employed serial dilution technique members of this series are capable of inhibiting the growth of that organism in very small amounts ranging from 0.4–12.5 micrograms per milliliter. They are thus adapted for topical application in various forms for vaginal administration. They can be combined as the active ingredient in a suppository or a cream suitable for intravaginal use. In such form, when introduced into the rat vagina, persistent antibacterial effect is observed for considerable time period. Such residual antibacterial effect is extremely desirable in the eradication of bacterial pathogens associated with bacterial vaginitis.

The members of this series are readily prepared. The method currently employed can be represented by this scheme:

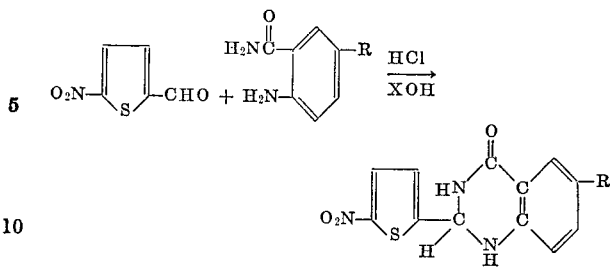

wherein R is as above defined and X is methyl, ethyl or isopropyl. Briefly this method consists in bringing together the aldehyde and the appropriate anthranilamide in the presence of a solvent such as ethanol under acid conditions preferably followed by heating until the reaction is completed and then filtering.

In order that this invention may be readily understood by and available to those skilled in the art the following examples are set forth:

EXAMPLE I 2,3-dihydro-6-nitro-2-(5-nitro-2-thienyl)
quinazolin-4(1H)one

A mixture of 2-amino-5-nitrobenzamide (2.3 g., .012 mole) in 32 ml. of ethanol was treated with 5-nitro-2-thiophenecarboxaldehyde in 6.4 ml. of ethanol and 1 ml. of concentrated hydrochloric acid. The reaction mixture was refluxed with stirring for 2 hours. The resulting solution was cooled in the refrigerator overnight and filtered to yield a yellow brown solid (2 g., 52%). Recrystallization from ethanol DMF/H$_2$O (Darco) gave a M.P. of 210–211° C.

*Analysis*.—Calcd. for C$_{12}$H$_8$N$_4$O$_5$S (percent): C, 45.00; H, 2.52; N, 17.50. Found (percent): C, 44.97; H, 2.52; N, 17.25.

EXAMPLE II 6-chloro-2,3-dihydro-2-(5-nitro-2-thienyl)
quinazolin-4(1H)one

A warm solution of 171 g. (1.0 mole) of 2-amino-5-chlorobenzamide in 2500 ml. of ethanol was treated with a warm solution of 157 g. (1.0 mole) of 5-nitro-2-thiophenecarboxaldehyde in 500 ml. of ethanol, conc. HCl (30 ml.) was added and the mixture was heated on a steam bath for 1 hour. The resulting solution was cooled in the refrigerator overnight and the product was collected by filtration as a brown solid in a yield of 208 g. (67%). Recrystallization from ethanol (Darco) gave yellow needles melting at 196–198° C.

*Analysis*.—Calcd. for C$_{12}$H$_8$ClN$_3$O$_3$S (percent): C, 46.53; H, 2.60; N, 13.57. Found (percent): C, 46.42; H, 2.54; N, 13.53.

EXAMPLE III 2,3-dihydro-2-(5-nitro-2-thienyl)quinazolin-4(1H)one

A solution of 5 - nitro - 2 - thiophenecarboxaldehyde (157.0 g., 1.0 mole) in ethanol (1000 ml.) was warmed on a steam bath and treated with 20 ml. of conc. HCl. To it was added with rapid stirring a warm solution of anthranilamide (136.0 g., 1.0 mole) in ethanol (500 ml.). The reaction mixture was heated on a steam bath and stirred for 1 hour, then chilled in ice and filtered. The product was washed with aqueous ethanol and air dried (227 g., 82.5%). Recrystallization from ethanol (Darco) yielded yellow needles which melted at 219–221°.

*Analysis*.—Calcd. for C$_{12}$H$_9$N$_3$O$_3$S (percent): C, 52.35; H, 3.29; N, 15.26. Found (percent): C, 52.60; H, 3.55; N, 15.10.

What is claimed is:
1. A compound of the formula:
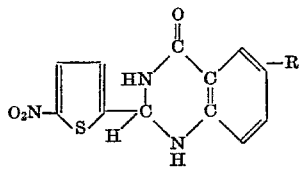
wherein R is hydrogen, chloro or nitro.
2. The compound of claim 1 wherein R is hydrogen.
3. The compound of claim 1 wherein R is chloro.
4. The compound of claim 1 wherein R is nitro.
References Cited
UNITED STATES PATENTS
3,162,636  12/1964  Gurien et al. _____ 260—251
3,455,920  7/1969   Yale _____ 260—251
ALEX MAZEL, Primary Examiner
R. V. RUSH, Assistant Examiner
U.S. Cl. X.R.
424—251